Figure 1:
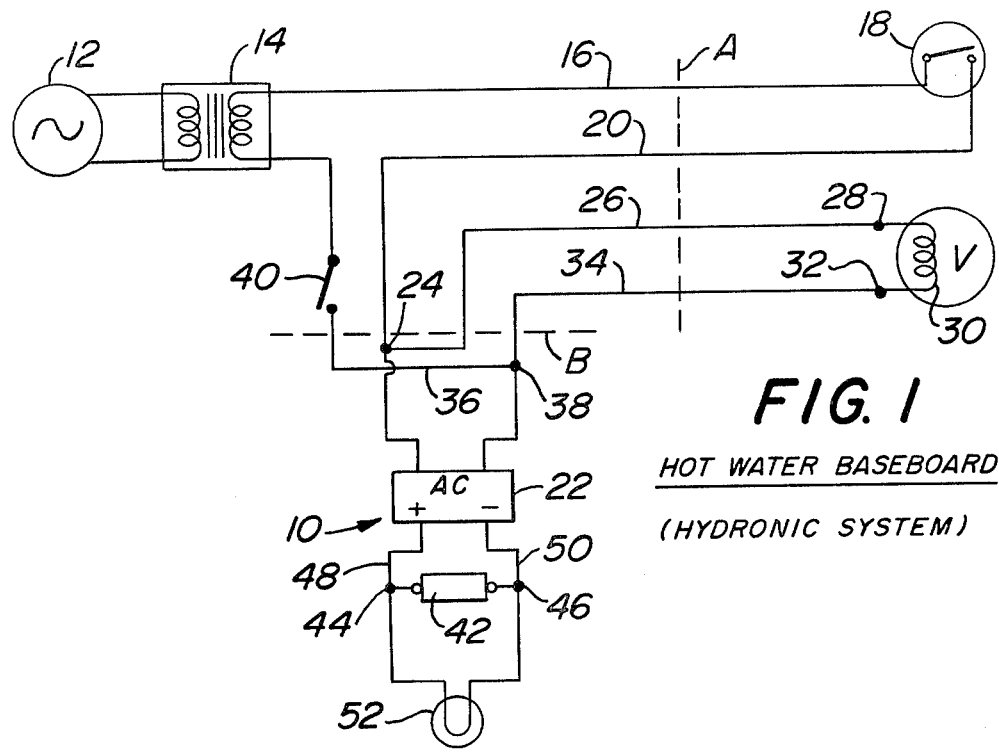

United States Patent [19]

McHugh

[11] Patent Number: 4,484,620

[45] Date of Patent: Nov. 27, 1984

[54] SYSTEM FOR MONITORING ENERGY USAGE IN SEPARATE UNITS OF MULTIPLE-UNIT STRUCTURE

[75] Inventor: Thomas K. McHugh, Glenside, Pa.

[73] Assignee: First Edgemont Corp., Media, Pa.

[21] Appl. No.: 316,147

[22] Filed: Oct. 29, 1981

[51] Int. Cl.³ .......................... F28F 0/00; G01K 17/00
[52] U.S. Cl. ..................................... 165/11 R; 236/94; 374/41
[58] Field of Search ........................ 165/11 R; 236/94; 364/557; 374/39, 41; 73/193 R

[56] References Cited

U.S. PATENT DOCUMENTS

| | | | |
|---|---|---|---|
| 1,359,914 | 11/1920 | Petersen | 374/39 |
| 2,329,813 | 9/1943 | Amsler | 374/39 |
| 3,716,096 | 2/1973 | Berrett et al. | 364/557 |
| 3,995,686 | 12/1976 | Laube | 165/11 R |
| 4,002,890 | 1/1977 | Welin | 364/557 |
| 4,049,044 | 9/1977 | Cohen | 236/94 |
| 4,221,260 | 9/1980 | Otala et al. | 165/11 R |
| 4,306,293 | 12/1981 | Narathe | 364/557 |
| 4,339,073 | 7/1982 | Staloff | 236/94 |
| 4,363,441 | 12/1982 | Feinberg | 236/94 |

FOREIGN PATENT DOCUMENTS

| | | | |
|---|---|---|---|
| 43477 | 4/1977 | Japan | 374/41 |
| 889816 | 2/1963 | United Kingdom | 374/39 |
| 928395 | 6/1963 | United Kingdom | 374/39 |

OTHER PUBLICATIONS

*Heat Transfer*, J. P. Holman; McGraw Hill Co., 5th Ed., 1981, pp. 12-13.

*Primary Examiner*—Albert W. Davis, Jr.
*Attorney, Agent, or Firm*—Eugene E. Renz, Jr.

[57] ABSTRACT

A system of monitoring energy usage for heating or cooling separate units in a multi-unit structure employing thermostat means to control delivery of hot or cold fluid to the unit, an elapsed time meter, a first circuit interconnecting the thermostat with the power source and meter and a second circuit in parallel with the first interconnecting the means to control delivery of the hot or cold fluid to the unit with the elapsed time meter to provide a tamper-proof, economically installable and reparable system. The system will not meter time of usage when insufficiently hot or cold fluid is delivered to the occupancy unit even when called for by its thermostat. The system also includes a method of determining energy usage in each individual unit using the elapsed time meter reading.

6 Claims, 2 Drawing Figures

HOT WATER BASEBOARD (HYDRONIC SYSTEM)

HOT WATER BASEBOARD
(HYDRONIC SYSTEM)

HOT AIR HEAT OR AIR CONDITIONING

SYSTEM FOR MONITORING ENERGY USAGE IN SEPARATE UNITS OF MULTIPLE-UNIT STRUCTURE

This invention relates to a system of monitoring energy usage for comfort heating or cooling separate units, such as apartments, condominiums or offices, in multiple-unit buildings.

Many existing multiple-unit buildings are equipped with centrally metered fuel. The current practice is not to charge each occupancy unit for the actual energy consumed in each unit but, rather, an averaged portion of the overall fuel consumption by the building. This not only produces inequities in the so-averaged monthly fuel bill charged to the occupant but, in addition, creates no incentive for energy conservation.

The primary object of the invention is to provide a system of monitoring individual occupancy unit usage of energy in hot water baseboard (hydronic) and hot air heating and air conditioning, thereby reducing the aforementioned inequities and inducing the occupant of the individual unit to conserve energy.

Another object of the invention is to provide an individual occupany unit energy monitoring system which is inexpensive to manufacture, install and operate as it employs many components already existing in the building, such as power supplies, transformers, thermostats, zone valves for delivering hot water in baseboard heating systems upon call from the thermostat and coils of the switching relays for energizing fans for delivery of hot or cold fluid in hot air and air conditioning systems, and relatively simple circuitry, contrary to the system described in the most pertinent reference known to applicant, namely, the Laube U.S. Pat. No. 3,995,686 which ties in metering with fan and compressor operation and high voltage equipment.

Another object of the invention is to provide a monitoring system of the character described which is tamper proof and meters only true usage of energy since the meter runs on the same power supply and in parallel with the coil or motor of the zone valve in hot water baseboard heating and the coil of the switching relay which energizes the fan of the hot air heater or air conditioner.

Figure 2:
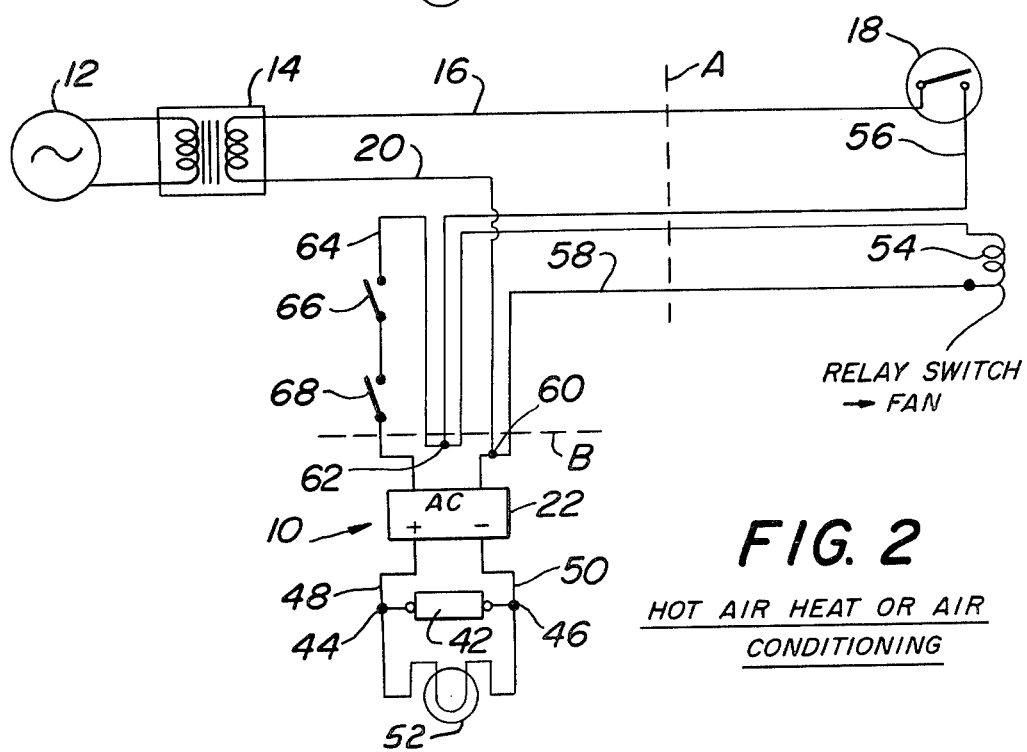

These and other objects and features of the invention will become more apparent as the following description proceeds in conjunction with the accompanying drawing wherein:

FIG. 1 is a diagrammatic view of the present system as applied to hot water baseboard (hydronic) system; and FIG. 2 is a view similar to FIG. 1 of the present system as applied to hot air heat or air conditioning.

Specific reference will now be made to the drawings in which similar reference characters are used for corresponding elements throughout.

Referring first to FIG. 1, those portions of the instant monitoring system which are pre-existing in the individual occupany unit, i.e., apartment, condominium or office, are shown to the right of vertical dotted line A, and those portions which are added are shown generally at 10 below the horizontal line B.

A 110 volt AC power source is indicated at 12, the voltage of which is stepped down to 24 volts by a conventional transformer 14, commercially available, for example, from Honeywell as transformer #ST72D1212. One leg of the transformer is operatively connected by conductive wire 16 to a temperature sensitive electrical switch 18, which in the preferred embodiment is a conventional low voltage thermostat which pre-exists in the occupany unit and is commercially available, for example, from Honeywell as thermostat #T87F2873 or #T822. The thermostat controls the heat desired for the unit and, when it closes, electricity is conducted through wire 20 to the measuring monitor 10, supplying electrical power to one leg of the AC side of a conventional rectifier such as a full wave rectifier 22 which converts the power to DC.

In the monitor, the wire 20 is connected as at 24 to another conductive wire 26 which is operatively connected as at 28 to one leg of an electrically operable control element 30 which in the preferred embodiment is a conventional 24 volt activatable zone valve V in the occupancy unit, commercially available from Honeywell as valve #V8042 or Taco #571-2. The other leg of the zone valve coil is connected as at 32 to wire 34 which is, in turn, connected to the rectifier circuit 22. A further wire 36 is connected as at 38 to the common wire 34 and to the other leg of the transformer 14, the completion of the circuit of which is interrupted by a low limit thermostatic switch 40 which is located on the hot supply pipe out of the boiler which feeds all the units in the multi-unit structure (not shown). The operation of switch 40 is automatic. It will close with a temperature rise at a proper predetermined setting (for example, 120° F.) whereupon hot water will be circulated through the baseboard finned pipes when called for by the thermostat. The switch 40 will open when the temperature falls below the proper setting to stop circulation of cool water to the units so that the occupant will not receive such cold water even if the thermostat 18 should call for it and, of course, the meter member 42 of measuring monitor 10 will not run and the occupant will therefore not be held to account for such usage.

Meter 42 is a conventional elapsed time, 24 volt DC recording device, for each occupany unit and is connected as at 44 and 46 between two wires 48 and 50 which are, in turn, connected to the DC side of the rectifier circuit 22, there being an indicator light 52 also connected to the wires 48 and 50.

Referring now to FIG. 2, the power source 12, transformer 14, conductive wire 16, temperature sensitive electrical switch 18, rectifier 22, time elapsed meter 42 and light 52 connected by wires 48 and 50 to the DC side of the rectifier 22 are the same as those in FIG. 1. However, for hot air heat or air conditioning, the electrically operable control element 30 of the zone valve V is in this embodiment is a coil 54 of a conventional switching relay which, when called upon by the switch 18, energizes the fan for the hot air heating system for delivery of hot air or cool air from the air conditioner. The switch 18 is operatively connected by conductive wire 56 to one leg of the coil 54, the other leg of which is connected by conductive wire 58 to one input terminal in the rectifier 22. Wire 20 from the other leg of the transformer 14 is connected as at 60 to the wire 58.

Wire 56 from the thermostat is connected as at 62 to another conductive wire 64 which connects to the other input terminal of the rectifier, the completion of the circuit being interrupted by two low-limit thermostatic switches 66 and 68.

In the hot air heating operation, the switch 66, which is located in the duct supplying hot air to the occupancy unit, closes with a temperature rise at appropriate predetermined temperature in the hot air supply duct (not shown), and switch 68, which is located in the furnace or the hot supply pipe of a forced air heat exchanger (not shown), closes with a temperature rise at an appropriate predetermined temperature in the furnace to the hot supply pipe (also not shown). When these switches close, heat is delivered to the occupancy unit when called for by temperature sensitive electric switch 18 and the time of usage of energy for such delivery is metered. The thermostatic switches 66 and 68 allow metered heat to be delivered when two conditions occur simultaneously, i.e. adequately high temperature in the supply duct and at the heat source.

For cooling, thermostatic switch 66 closes with a temperature fall at an appropriate predetermined temperature in the supply duct, and thermostatic switch 68 will also close with a temperature fall at an appropriate temperature on the cold supply pipe of the forced air heat exchanger (not shown). Thus, when the switches 66 and 68 are closed, the air conditioner will run as called for by switch 18 and the time of usage of the electrical power therefor will be metered. As in the case of the hot air system, the thermostatic switches 66 and 68 will allow metered cool air to be delivered to the occupancy unit when two conditions occur simultaneously, i.e. adequately cold temperature in the supply pipe and in the cold supply pipe to the heat exchanger. This insures that cool air in the heating system and warm air in the air conditioning system will not be delivered even if called for by the thermostat 18, and the meter 42 will not run.

As will be seen in both figures, the elapsed time meter 42 runs off the same power supply 12 and in parallel with the circuit through the control element 30 or 54. Thus, the meter functions at all time to record the elapsed time only when energy is used to supply heat or cold air and is tamper proof.

As will be seen in FIG. 1, the conductive leads 16, 20, 26, 34 and 36 interconnect the components of the system such that if the occupant attempts to short circuit or disconnect any of the wires to cheat the meter, he will get either metered heat or cold or none at all because of the parallel circuitry. For example, if wires 16 and 20 are shorted, this would be the same as switch 18 closing and metered heat or cold air will be delivered. If wires 26 and 34 are shorted, coil 30 or 54 is rendered inoperative and no heat or cold air will be delivered. If either wires 16, 20, 26 or 34 are broken, no heat will be delivered. Additionally, if the occupant did not pay his heating bill and the fuel supply was cut off, or if the boiler could not operate for some other reason, in the hydronic heating system, cold water would circulate through the baseboard when temperature sensitive switch 18 would call for heat. So that the occupant would not be charged for use only of cold water, thermostatic switch 40 will remain open and the meter 42 will not run. The same considerations apply to hot air heat and air conditioning use.

It will be noted that the meter 42 measures the time of use of energy by the occupancy unit. The proportional amount of energy used by the unit can be determined by knowing the size of the heat or cold distribution system, the average operating efficiency and the amount of time of operation. As an example in the hydronic heating system, if the amount of the baseboard fin area is known to be a constant for each individual apartment or unit (as determined by a one-time observation or blueprints) and the average operating temperature differential is determined by observation (as by instantaneous pyrometer readings), the following formulas can be used to determine energy usage for each apartment or unit from these factors plus the metered elasped time of use:

STEP 1:

New Cumulative Hour Meter Reading for Each Apartment − Last Month's Cumulative Reading = New Monthly Hour Usage for Each Apartment

STEP 2:

$$\frac{\text{Total Building Fuel Charge For the New Month}}{\text{Sum of New Monthly Hour Usages for All Apartments} \times \text{Total Length in Feet of All the Building Finned Baseboard}} = \frac{\$}{\text{Hour} - \text{Foot}}$$

STEP 3:

$$\frac{\$}{\text{Hour} - \text{Foot}} \times \text{Length in Feet of Finned Baseboard in Each Separate Apartment} \times \text{Temperature Differential} \times \text{Correction Factor}$$

Each Apartment's Recorded Hours for the Month = Each Apartment's Space Heat Fuel Usage Bill for the Month While preferred embodiments of the invention have here been shown and described, it will be understood that variations may be made by skilled artisans without departing from the spirit of the invention.

What is claimed is:

1. A system for measuring energy consumed for heating or cooling units of a multi-unit structure, the multi-unit structure having a distribution system for providing heating or cooling medium to the units and a source of electrical energy, the measuring system for each unit comprising:

a temperature sensitive electric switch element in the unit;

an electrically operable control element in the unit for controlling the flow of heating or cooling medium provided by the distribution system;

measuring means for measuring the amount of heating or cooling medium provided to a unit; and circuit means, including a plurality of conductive leads at least four of which extend into the unit and connect to the switch element and the control element, for interconnecting the switch element, the control element, and the measuring means to the source of electrical energy so that during normal operation the switch element will control the operation of the control element and the measuring means will measure the amount of heating or cooling medium provided to the unit through the control element, and further so that if the conductive leads connected to the switch element or the control element are broken or connected to bypass those elements the measuring means will not be prevented from measuring the amount of heating or cooling medium provided to the unit, thereby providing a tamper-proof system.

2. The system of claim 1 as applied to an hydronic heating system having a hot water pipe, further comprising a second temperature sensitive electrical switch element associated with the hot water pipe and operative to close at a predetermined temperature allowing the control element to open and deliver heating or cooling medium to the unit upon call from the first-named temperature sensitive electrical switch element.

3. The system of claim 1 as applied to a hot air system having a supply duct and a hot supply pipe of a forced air heat exchanger, further comprising, two additional temperature sensitive electric switch elements each associated with the supply duct and the hot supply pipe, the additional switches are operative to close with the rise of a predetermined temperature in the supply duct and the supply pipe to allow the control element to permit the passage of the hot air upon call from the first-named temperature sensitive electric switch element.

4. The system of claim 1 as applied to an air conditioning system having a supply duct and cold supply pipe of a forced air heat exchanger, further comprising two additional temperature sensitive electric switch elements associated with the supply duct and the cold supply pipe, the additional switch elements being operative to close with a fall of predetermined temperature in the supply duct and the cold supply pipe allowing the operation of the control element upon call from the first-named temperature sensitive electric switch element.

5. The system of claim 1 as applied to an hydronic heating system having water as the heating or cooling medium, wherein the electrically operable control element comprises an electric zone value.

6. The system of claim 1 as applied to a hot air system having air as the heating or cooling medium, wherein the electrically operable control element comprises an electric switching relay and a fan, connected by the circuit means such that when an appropriate electric signal is applied thereto, the relay switches making the fan operational.

* * * * *